United States Patent [19]

Yamazaki

[11] Patent Number: 4,890,291
[45] Date of Patent: Dec. 26, 1989

[54] LASER OSCILLATOR CONTROL CIRCUIT

[75] Inventor: Etsuo Yamazaki, Hachioji, Japan

[73] Assignee: Fanuc Ltd., Minamitsuru, Japan

[21] Appl. No.: 273,520

[22] PCT Filed: Feb. 19, 1988

[86] PCT No.: PCT/JP88/00184
§ 371 Date: Nov. 3, 1988
§ 102(e) Date: Nov. 3, 1988

[87] PCT Pub. No.: WO88/07274
PCT Pub. Date: Sep. 22, 1988

[30] Foreign Application Priority Data

Mar. 20, 1987 [JP]  Japan .................. 62-066777

[51] Int. Cl.⁴ .................. H01S 3/00
[52] U.S. Cl. .................. 372/38; 372/29; 372/30
[58] Field of Search .................. 372/8, 9, 25, 29, 30, 372/33, 38

[56] References Cited

U.S. PATENT DOCUMENTS 3,806,829  4/1974  Duston et al. .................. 372/25
4,627,063  12/1986  Hosokawa .................. 372/38

FOREIGN PATENT DOCUMENTS 0107693   6/1983  Japan .................. 372/38
0228689  10/1986  Japan .................. 372/38

Primary Examiner—William L. Sikes
Assistant Examiner—B. R. R. Holloway
Attorney, Agent, or Firm—Staas & Halsey

[57] ABSTRACT

A laser oscillator control circuit controls a command voltage to control the output power of a laser. The laser oscillator control circuit has pulse generating means (8) that employs a timer for generating a pulse train in response to a signal from time setting means (5, 6) which sets an on-time and an off-time. The laser oscillator cotnrol circuit also has bias command voltage setting means (9) for setting data defining a bias command voltage at which an electric discharge can be started, and output voltage setting means (10) for setting data defining an output power voltage which is the sum of the output power and the bias command voltage. A selector (11) selects and outputs the output power voltage when the pulse train is on and selects and outputs the bias command voltage when the pulse train is off. The output from the selector is converted by a D/A converter (12) into an analog voltage to control a high-frequency power supply (21).

6 Claims, 2 Drawing Sheets

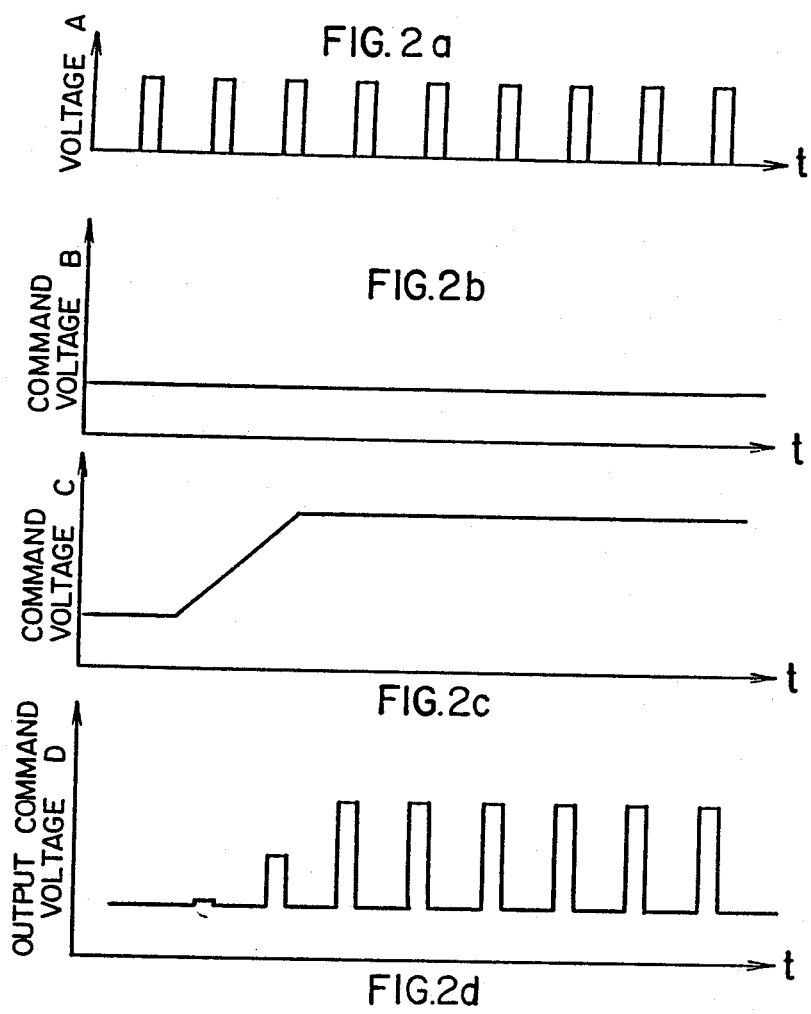

LASER OSCILLATOR CONTROL CIRCUIT

DESCRIPTION

CROSS REFERENCE TO RELATED APPLICATIONS

This application is related to the following copending applications assigned to the same assignee as this application:
1. U.S. Ser. No. 07/283,472 filed Nov. 30, 1988;
2. U.S. Ser. No. 07/273,479 filed Dec. 5, 1988;
3. U.S. Ser. No. 07/283,325 filed Dec. 5, 1988;
4. U.S. Ser. No. 07/295,203 filed Dec. 20, 1988;
5. U.S. Patent Application entitled LASER OSCILLATOR DEVICE filed Jan. 12, 1989.

TECHNICAL FIELD

The present invention relates to a laser oscillator control circuit, and more particularly to a laser oscillator control circuit for generating a train of control pulses in a digital manner.

BACKGROUND ART

Power supplies for producing high-frequency electric power from a direct current have widely been employed to supply electric power to laser oscillators. In order to generate high-frequency electric power, it is necessary to employ a laser oscillator control circuit for producing a pulse train to control the high-frequency electric power.

The laser oscillator control circuit has heretofore been constructed of a variable oscillator with its oscillation frequency variably dependent on the input voltage. The variable oscillator has been advantageous in that its output pulse train can freely be varied by varying the input voltage.

However, since the variable oscillator is operated under analog control, the accuracy of the pulse train is not necessarily sufficient under the influences of temperature, aging, and the like. When the off-time of the pulse train is zero (i.e., when the oscillator is 100% on) and when the on-time of the pulse train is zero (i.e., when the oscillator is 0% on, the laser oscillator control circuit of the conventional analog control type has to be controlled in special modes. Therefore, the control process is complex and the number of parts required for the control process is large.

SUMMARY OF THE INVENTION

It is an object of the present invention to provide a laser oscillator control circuit which will solve the above problems and which can generate a train of control pulses in a digital fashion.

To solve the above problems, there is provided according to the present invention a laser oscillator control circuit for controlling a command voltage to control the output power of a laser, comprising: time setting means for setting an on-time and an off-time; pulse generating means having a timer for generating a pulse train corresponding to said on-time and said off-time in response to a signal from said time setting means; bias command voltage setting means for setting data of a bias command voltage to determine a lowest level at which an electric discharge can be started; output voltage setting means for setting data of an output power voltage which is the sum of a voltage to produce the output power and said bias command voltage; and a selector for selecting and outputting the output power voltage when said pulse train is on and for selecting and outputting said bias command voltage when said pulse train is off. Since the pulse train is digitally established by the time setting means, it can be determined highly accurately.

Also the output power voltage is selected when the pulse train is on and the bias voltage is selected when the pulse train is off. Therefore, the output from the selector can be employed as a control signal for the laser oscillator control circuit.

BRIEF DESCRIPTION OF THE DRAWINGS

FIGS. 2(a), (b), (c), and (d) are diagrams showing the waveforms of various signals.

DESCRIPTION OF THE PREFERRED EMBODIMENT

Figure 1:
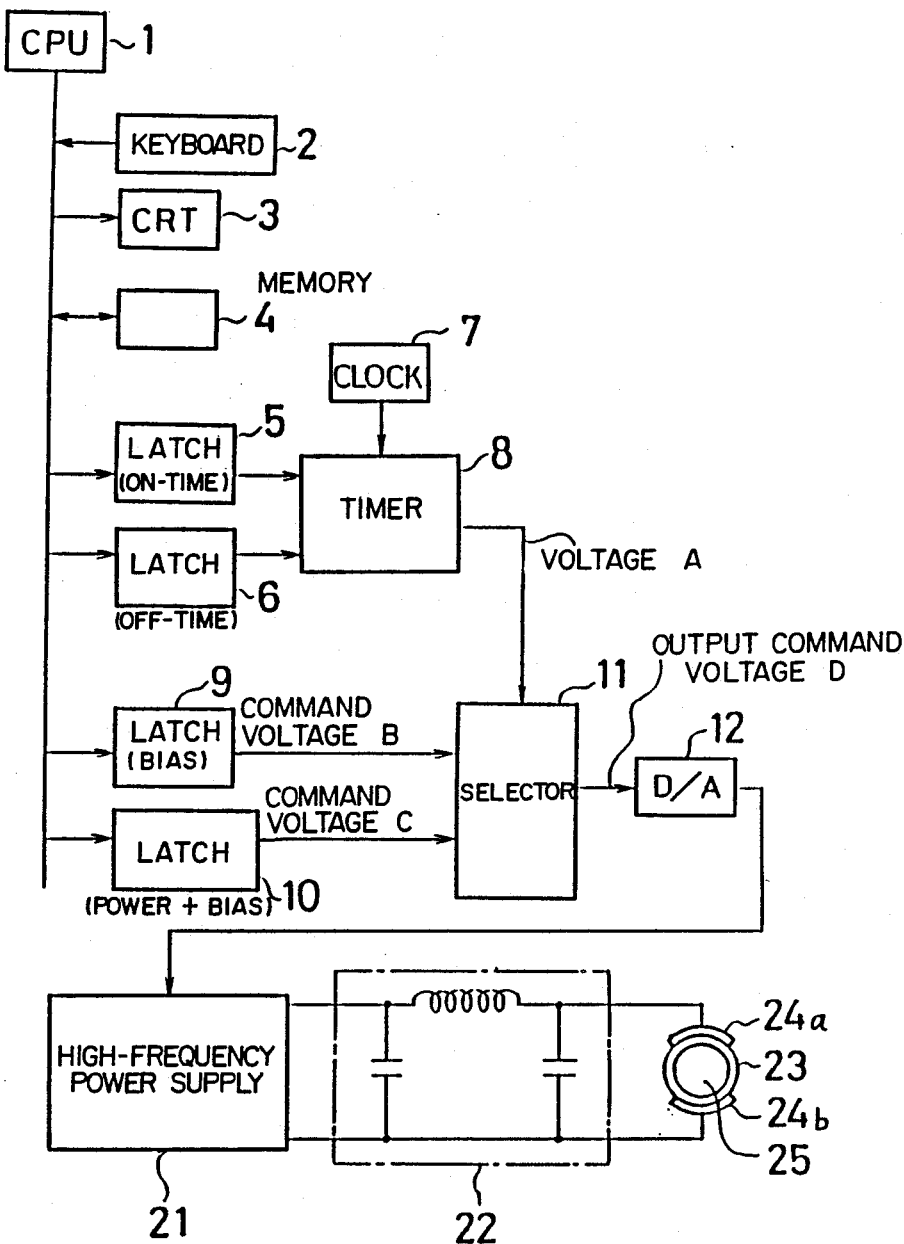
FIG. 1 is a block diagram of an embodiment of a laser oscillator control circuit according to the present invention.

An embodiment of the present invention will hereinafter be described in specific detail with reference to the drawings.

FIG. 1 is a block diagram of an embodiment of a laser oscillator control circuit according to the present invention. Denoted in FIG. 1 at 1 is a processor for controlling the entire circuit, at 2 is a keyboard, connected to the processor 1 through a bus for entering and modifying data, and at 3 is a CRT for displaying various data. The keyboard 2 can command the CRT 3 to select what to display. A memory 4 comprises a ROM for storing a control program and a RAM for storing various data.

A latch 5 serves to hold or set data defining an on-time of a pulse train, which may be entered through the keyboard 2, for example. A latch 5 serves to hold or set data defining an off-time of a pulse train. A pulse train can be specified by holding an on-time and an off-time of such a pulse train in these two latches. A clock oscillator 7 generates clock pulses of a constant cyclic period. A timer 8 is turned on by clock pulses from the clock oscillator 7 for a time maintained by the latch 5, to produce a pulse train which is turned off for time maintained by the latch 6. The timer 8 may advantageously be a commercially available programmable timer or the like.

A latch 9 serves to hold or set data defining a voltage value corresponding to a bias voltage to be applied to a laser tube. The bias voltage is a voltage applied to the laser tube. When the bias voltage is exceeded, an electric discharge is started to effect laser oscillation. A latch 10 serves to hold or set data defining a voltage value corresponding to the sum of the bias voltage and a desired value of output power of the laser beam provided by a laser tube 23. A selector 11 is responsive to a train of output pulses (voltage A) from the timer 8 for selecting and outputting a command voltage C from the latch 10 when the pulse train is on. When the pulse train (voltage A) is off, the selector 11 selects and outputs a command voltage B from the latch 10.

The above relationship is illustrated in FIG. 2. FIG. 2(a) shows the voltage A which is the output from the timer 8, the voltage A being a pulse train.

FIG. 2(b) shows the output from the lath 9, representing the command voltage B which indicates the bias voltage.

FIG. 2(c) illustrates the output from the latch 10, indicating the command voltage C which is the sum of the bias voltage and the desired value of output power.

FIG. 2(d) shows the output from the selector 11, representing an output command voltage D as shown in which the command signal C is selected when the voltage A (pulse train) is on and the command signal B is selected when the voltage (pulse train) is off.

In FIG. 2(d), the output from the selector 11 has its pulse height proportional to the command voltage C according to the command voltage C. However, the duration of the pulses may be made proportional to the command voltage C.

Turning back to FIG. 1, the output voltage D from the selector 11 is amplified and converted by a D/A converter 12 into an analog voltage which is supplied to a high-frqeuency power supply 21. The high-frequency power supply 21 is controlled by a control signal (the shape of which is identical to that of the output command voltage D) from the D/A converter 12, to produce a high-frequency power output which is similar to the control signal. A matching circuit 22 serves to achieve matching between the high-frequency power supply and the laser tube so that the output from the high-frequency power supply can be supplied to the laser tube efficiently.

The laser tube, denoted at 23, is made of quartz or the like and contains a laser medium gas 25 therein. Designated at 24a, 24b are electrodes to which the high-frequency electric power is applied.

Since the on-time and the off-time can digitally be established, a pulse frequency and a pulse duty cycle can stably be supplied. By equalizing the off-time to zero, a continuous output can be produced, and by equalizing the on-time to zero, an output indicative of only the bias voltage can be obtained.

While the on-time and the off-time are established through the keyboard in the above description, they may be commanded by a machining program.

With the present invention, as described above, since the on-time and the off-time can digitally be established, a pulse frequency and a pulse duty cycle can stably be supplied. By equalizing the off-time to zero, a continuous output can be produced, and by equalizing the on-time to zero, an output indicative of only the bias voltage can be obtained.

I claim:

1. A laser oscillator control circuit for controlling a command voltage to control an output power of a laser that is dependent upon an electric discharge and at least an output voltage, comprising:
   time setting means for setting an on-time and off-time;
   pulse generating means having a timer for generating a pulse train in accordance with said on-time and said off-time;
   bias command voltage setting means for setting data defining a bias command voltage representing a lowest level at which the electric discharge can be started;
   output voltage setting means for setting data defining an output power voltage which is the sum of output voltage to produce the output power and said bias command voltage; and
   selector means for selecting and outputting the output power voltage when said pulse train is on and for selecting and outputting said bias command voltage when said pulse train is off.

2. A laser oscillator control circuit according to claim 1, wherein said time setting means comprises a latch.

3. A laser oscillator control circuit according to claim 1, wherein said time setting means includes a keyboard for entering said on-time and said off-time.

4. A laser oscillator control circuit according to claim 1, wherein said on-time and said off-time are commanded by a program.

5. A laser oscillator control circuit according to claim 1, wherein said output power voltage comprises a pulse signal having a magnitude varying in accordance with the output power voltage.

6. A laser oscillator control circuit according to claim 1, wherein said output power voltage comprises pulse signal having a pulse duration varying in accordance with the output power voltage.

* * * * *